United States Patent
Balci et al.

(10) Patent No.: US 9,165,337 B2
(45) Date of Patent: Oct. 20, 2015

(54) COMMAND INSTRUCTION MANAGEMENT

(71) Applicant: QUALCOMM Incorporated, San Diego, CA (US)

(72) Inventors: Murat Balci, Orlando, FL (US); Christopher Paul Frascati, Oviedo, FL (US); Avinash Seetharamaiah, Chuluota, FL (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/027,816

(22) Filed: Sep. 16, 2013

(65) Prior Publication Data

US 2014/0354660 A1 Dec. 4, 2014

Related U.S. Application Data

(60) Provisional application No. 61/829,487, filed on May 31, 2013.

(51) Int. Cl.
*G06F 13/28* (2006.01)
*G06T 1/20* (2006.01)
*G06F 9/38* (2006.01)
*G06F 9/50* (2006.01)
*G06T 1/60* (2006.01)

(52) U.S. Cl.
CPC .............. *G06T 1/20* (2013.01); *G06F 9/3881* (2013.01); *G06F 9/50* (2013.01); *G06T 1/60* (2013.01)

(58) Field of Classification Search
None
See application file for complete search history.

(56) References Cited

U.S. PATENT DOCUMENTS

| 6,487,211 | B1 * | 11/2002 | Yamaguchi | 370/412 |
|---|---|---|---|---|
| 7,234,144 | B2 | 6/2007 | Wilt et al. | |
| 7,327,755 | B2 * | 2/2008 | Nie | 370/466 |
| 7,421,694 | B2 | 9/2008 | Gosalia et al. | |
| 8,120,608 | B2 | 2/2012 | Jiao et al. | |
| 8,269,780 | B2 | 9/2012 | Swift et al. | |
| 8,595,394 | B1 * | 11/2013 | Danilak et al. | 710/57 |
| 2004/0160449 | A1 | 8/2004 | Gossalia et al. | |
| 2005/0052463 | A1 * | 3/2005 | Hung | 345/531 |
| 2007/0174739 | A1 * | 7/2007 | Yoshida | 714/54 |
| 2008/0109810 | A1 | 5/2008 | Pronovost et al. | |
| 2010/0205367 | A1 * | 8/2010 | Ehrlich et al. | 711/113 |
| 2011/0099338 | A1 * | 4/2011 | Binz et al. | 711/154 |
| 2011/0320724 | A1 | 12/2011 | Mejdrich et al. | |

OTHER PUBLICATIONS

International Search Report and Written Opinion—PCT/US2014/036239—ISA/EPO—Sep. 26, 2014, 11 pp.

* cited by examiner

*Primary Examiner* — Elias Mamo
(74) *Attorney, Agent, or Firm* — Shumaker & Sieffert, P.A.

(57) ABSTRACT

Techniques are described for writing commands to memory units of a chain of memory units of a command buffer. The techniques may write the commands, and if during the writing, it is determined that there is not sufficient space in the chain of memory unit, the techniques may flush previously confirmed commands. If after the writing, the techniques determine that there is not sufficient space in an allocation list for the handles associated with the commands, the techniques may flush previously confirmed commands.

32 Claims, 5 Drawing Sheets

COMMAND INSTRUCTION MANAGEMENT

This application claims the benefit of U.S. Provisional Application No. 61/829,487, filed May 31, 2013, the entire content of which is hereby incorporated by reference.

TECHNICAL FIELD

This disclosure relates to techniques for graphics processing, and more particularly relates to techniques for storing commands for graphics processing.

BACKGROUND

Visual content for display, such as content for graphical user interfaces and video games, may be generated by a graphics processing unit (GPU). A GPU may convert two-dimensional (2D) or three-dimensional (3D) graphical objects into a 2D pixel representation that may be displayed on a display device. To perform its functions, the GPU executes commands issued by an application processor such as the central processing unit (CPU). In general, the CPU stores the commands in a command buffer, and the GPU retrieves the commands from the command buffer for execution.

SUMMARY

In general, this disclosure describes confirm-based command buffer queue generation techniques. For example, the techniques describe confirming commands after the writing. By confirming the commands, if a next set of commands cannot be written or there is not sufficient space in the allocation list for handles associated with the next set of commands, as determined during the writing of the next set of commands, the processor may submit the confirmed commands so that additional memory units can be utilized or the allocation list can be reset.

For instance, if the processor is able to write the set of commands in the memory units of the command buffer, the processor may identify a confirm point that identifies the location in the memory unit where the processor finished writing the set commands (e.g., the location of an end of the set of commands in the memory unit). The processor may then write the next set of commands staring from the confirm point. If, however, the processor determines that the entire set of commands cannot be written to the memory units, during the writing, or determines, after the writing of the commands, that there is not sufficient allocation list space of the handles associated with the set of commands, the processor may submit the commands prior to the confirm point. Submitting the commands prior to the confirm point may allow the processor to write the remaining commands of the set of commands in the additional memory units or create sufficient space for the handles associated with the commands after the confirm point.

In one example, the disclosure describes a method for storing commands, the method comprising writing, with a processor, a current set of commands to a chain of memory units in a command buffer starting from a current confirm point in a memory unit of the memory units. The method includes determining, with the processor, at least one of whether an end of the chain of memory units is reached with commands of the current set of command that have not yet been written to the chain of memory units during the writing of the current set of commands, and whether there is sufficient space in an allocation list to store handles associated with the current set of commands after the writing of the current set of commands. The method also includes submitting, with the processor, previously confirmed commands that were stored by the processor in the chain of memory units before the writing of the current set of commands if, based on the determination, the end of the chain of memory units is reached with commands of the current set of commands that have not yet been written to the chain of memory units or if, based on the determination, there is not sufficient space in the allocation list to store handles associated with the current set of commands.

In one example, the disclosure describes a device comprising a system memory comprising a command buffer, and a processor. The processor is configured to write a current set of commands to a chain of memory units in the command buffer starting from a current confirm point in a memory unit of the memory units. The processor is also configured to determine at least one of whether an end of the chain of memory units is reached with commands of the current set of command that have not yet been written to the chain of memory units during the writing of the current set of commands, and whether there is sufficient space in an allocation list to store handles associated with the current set of commands after the writing of the current set of commands. The processor is further configured to submit previously confirmed commands that were stored by the processor in the chain of memory units before the writing of the current set of commands if, based on the determination, the end of the chain of memory units is reached with commands of the current set of commands that have not yet been written to the chain of memory units or if, based on the determination, there is not sufficient space in the allocation list to store handles associated with the current set of commands.

In one example, the disclosure describes a computer-readable storage medium having instructions stored thereon that when executed cause one or more processors to write a current set of commands to a chain of memory units in a command buffer starting from a current confirm point in a memory unit of the memory units. The instructions also cause the one or more processors to determine at least one of whether an end of the chain of memory units is reached with commands of the current set of commands that have not yet been written to the chain of memory units during the writing of the current set of commands, and whether there is sufficient space in an allocation list to store handles associated with the current set of commands after the writing of the current set of commands. The instructions also cause the one or more processors to submit previously confirmed commands that were stored by the one or more processors in the chain of memory units before the writing of the current set of commands if, based on the determination, the end of the chain of memory units is reached with commands of the current set of commands that have not yet been written to the chain of memory units or if, based on the determination, there is not sufficient space in the allocation list to store handles associated with the current set of commands.

In one example, the disclosure describes a device comprising means for writing a current set of commands to a chain of memory units in a command buffer starting from a current confirm point in a memory unit of the memory units. The device also includes means for determining at least one of whether an end of the chain of memory units is reached with commands of the current set of command that have not yet been written to the chain of memory units during the writing of the current set of commands, and whether there is sufficient space in an allocation list to store handles associated with the current set of commands after the writing of the current set of commands. The device further includes means for submitting previously confirmed commands that were stored by the processor in the chain of memory units before the writing of the current set of commands if the end of the chain of memory units is reached with commands of the current set of commands that have not yet been written to the chain of memory units or if there is not sufficient space in the allocation list to store handles associated with the current set of commands.

The details of one or more examples are set forth in the accompanying drawings and the description below. Other features, objects, and advantages will be apparent from the description and drawings, and from the claims.

DETAILED DESCRIPTION

The techniques described in this disclosure are directed to storing command instructions in a command buffer. For purposes of illustration, the techniques of this disclosure are described with respect to the manner in which a processor stores command instructions for a graphics processing unit (GPU) in a command buffer.

For example, an application executing on the processor (e.g., central processing unit (CPU)) causes the processor to generate graphics data, as well as instructions that instruct another processor (e.g., the GPU) regarding the manner in which the data, such as graphics data, is to be processed. A graphics driver, also executing on the processor, converts the instructions into commands that the GPU can process and converts the graphics data into data packets that the GPU can process (e.g., pm4 data packets). The term "pm4 data packets" refers generally to data packets that the GPU can process, such as packets of commands or data. The processor, via the graphics driver, stores the commands and the generated graphics data in a system memory (e.g., the memory of the device that includes the processor and the GPU). In general, the processor, via the graphics driver, stores commands in a dedicated command buffer within the system memory. The operating system of the processor may dedicate a portion of the system memory as the command buffer.

According to the techniques described in this disclosure, the processor may attempt to write a set of commands to memory units of the command buffer without first determining whether there is sufficient space in the command buffer to store the commands, or whether there is sufficient space in an allocation list for handles associated with the commands. The command buffer can be considered as a chain of a plurality of memory units, where each unit can store a plurality of commands. If the processor is able to write the set of commands in the chain of memory units, and there is sufficient space in the allocation list for handles (described in more detail below) associated with the commands, the processor may identify the location in the memory unit of the memory units where the processor finished writing the set of commands. The location in the memory unit where the processor finished writing the set of commands is referred to as a confirm point, and the commands stored before the confirm point are referred to as confirmed commands. The processor may then write the next set of commands starting from the confirm point.

If the processor determines, during the writing of the next set of commands, that there is not sufficient space in the chain of memory units to write all of the commands of the next set of commands, the processor may trigger a flush to submit all confirmed commands to the GPU for eventual execution by the GPU. If the processor determines, after the writing of the next set of commands, that there is not sufficient space in the allocation list for the handles associated with the next set of commands, the processor may trigger the flush to submit all confirmed commands to the GPU for eventual execution by the GPU.

The submission of the commands to the GPU for eventual execution (i.e., the flush) allows the processor to add memory units to the chain of memory units for storing any remaining commands from the next set of commands that were not stored prior to the flush. Also, the submission of the commands clears the allocation list, which frees space the allocation list for the handles associated with the next set of commands.

In general, when the processor submits confirmed commands to the GPU for eventual execution by the GPU, the processor may be considered as utilizing any technique to make the commands available for execution. As one example, the processor may transfer the commands to a command buffer for the GPU. As another example, as part of submitting the confirmed commands, the processor may indicate to the GPU the memory addresses for the memory units that store the confirmed commands and location of the confirm point, so that, when the GPU is to execute the confirmed commands, the GPU can determine from where to access the commands. Other examples of submitting the confirmed commands to the GPU are possible, and the techniques should not be considered limited to the above examples of submitting confirmed commands.

In some other techniques, prior to writing to the command buffer, the processor would determine whether there is sufficient space in the current chain of memory units to store the commands and sufficient space in the allocation list for the handles associated with the commands. For example, the processor would determine how much memory space is needed for the commands that need to stored and determine how much space is currently available in the chain of memory units. Also, the processor would determine how much space is needed for the handles associated with the commands and how much space is currently available in the allocation list for the handles. If there is not sufficient space, the processor would perform a flush operation.

For instance, in these other techniques, if there is not sufficient space in the memory units or not sufficient space in the allocation list, as determined prior to the writing, the processor would submit the commands in the memory units and the allocation list, clear the allocation list, remove the memory units with the submitted commands from the chain, and add more memory units to the chain on an as needed basis (e.g., as part of the flush operation). However, determining ahead of time how much memory is needed to store the commands, how much memory is currently available in the current chain of memory units, how much space in the allocation list is needed for the handles, and how much space is currently available in the allocation list for the handles consumes considerable processing resources and increases processing time.

According to the techniques described in this disclosure, the processor may not need to flush the chain of memory units ahead of time if there is not sufficient space in the chain of memory units for the commands or if there is not sufficient space in the allocation list for the handles associated with the commands. Rather, the processor may first attempt to write the commands, and if, during the writing or immediately after the writing, the processor determines that the chain of memory units should be flushed, it is then that the processor flushes the chain of memory units.

It should be understood that although the techniques described in this disclosure are described with respect to commands that are executed by a GPU (e.g., GPU command generation), the techniques are not so limited. The techniques may be extended to non-GPU related command generation, and may be considered applicable to any stream generator of commands with multiple dependency (e.g., where a processor generates commands to be executed by another processing unit).

Figure 1:
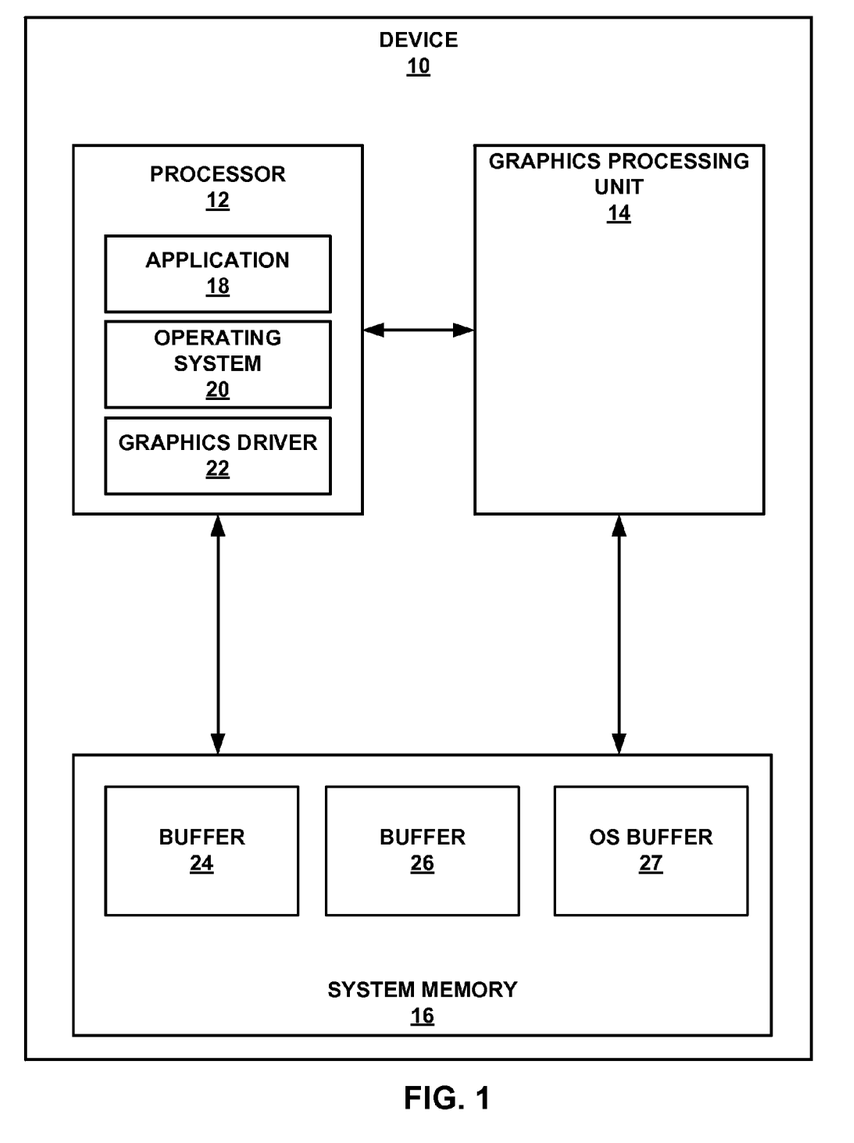
FIG. 1 is a block diagram illustrating a device that may be configured to implement one or more example techniques described in this disclosure.

FIG. 1 is a block diagram illustrating a device that may be configured to implement one or more example techniques described in this disclosure. For example, FIG. 1 illustrates device 10. Examples of device 10 include, but are not limited to, video devices, media players, set-top boxes, wireless handsets such as mobile telephones and so-called smartphones, personal digital assistants (PDAs), desktop computers, laptop computers, gaming consoles, video conferencing units, tablet computing devices, and the like.

Device 10 includes processor 12, graphics processing unit (GPU) 14, and system memory 16. Processor 12 may be the central processing unit (CPU). GPU 14 may be a processing unit configured to perform graphics related functions such as generate and output graphics data for presentation on a display, as well as perform non-graphics related functions that exploit the massive processing parallelism provided by GPU 14. For example, GPU 14 may execute both graphics applications and non-graphics applications. Because GPU 14 may provide general purpose processing capabilities in addition to graphics processing capabilities, GPU 14 may be referred to as a general purpose GPU (GP-GPU).

Examples of processor 12 and GPU 14 include, but are not limited to, a digital signal processor (DSP), a general purpose microprocessor, application specific integrated circuit (ASIC), field programmable logic array (FPGA), or other equivalent integrated or discrete logic circuitry. In some examples, GPU 14 may be a microprocessor designed for specific usage such as providing massive parallel processing for processing graphics, as well as for executing non-graphics related applications. Furthermore, although processor 12 and GPU 14 are illustrated as separate components, aspects of this disclosure are not so limited. For example, processor 12 and GPU 14 may reside in a common integrated circuit (IC).

System memory 16 is the system memory of device 10 and may reside external to processor 12 and GPU 14 (i.e., off-chip with respect to processor 12, and off-chip with respect to GPU 14). Examples of system memory 16 include, but are not limited to, a random access memory (RAM), a read only memory (ROM), or an electrically erasable programmable read-only memory (EEPROM), or any other medium that can be used to carry or store desired program code in the form of instructions or data structures and that can be accessed by a computer or a processor. For instance, system memory 16 may be considered as a computer-readable storage medium having instructions stored thereon that when executed cause one or more processors (e.g., processor 12 or GPU 14) to implement techniques described in this disclosure. In some examples, system memory 16 may be removed from device 10, and moved to another device. In some examples, a storage device, substantially similar to system memory 16, may be inserted into device 10.

System memory 16 may store applications that are executed by processor 12 and GPU 14. For example, processor 12 may execute application 18, operating system 20, and graphics driver 22. System memory 16 may store the object code for application 18, operating system 20, and graphics driver 22 that processor 12 retrieves for execution. Also, although not illustrated, GPU 14 may execute graphics related shader applications such as vertex shaders, fragment shaders, geometry shaders, and like, and may also potentially execute non-graphics related shader applications referred to as kernels or compute shaders. System memory 16 may store the object code, and possibly the source code as well, of such graphics and non-graphics related shader applications.

In some examples, system memory 16 may store data that GPU 14 is to operate on when executing the commands. For example, the data may include a list of graphics primitives (e.g., points, lines, triangles, quadrilaterals, triangle strips, etc.); however, other types of data may exist as well. System memory 16 may also store data resulting from the execution of commands or applications by GPU 14. For example, system memory 16 may store any combination of texture buffers, depth buffers, stencil buffers, vertex buffers, frame buffers, or the like.

Furthermore, system memory 16 may store commands that are to be executed by GPU 14, as well as the data that GPU 14 is to utilize. For example, as illustrated, processor 12 may execute application 18. Examples of application 18 include video games, web browsers, e-mail, and generally any application that produces viewable content for display. To leverage the graphics processing of GPU 14, application 18 may generate commands that GPU 14 is to execute, as well as the data that GPU 14 is to operate on as part of the execution of the commands.

Graphics driver 22, executing on processor 12, may convert the commands into commands that are executable by GPU 14. For example, graphics driver 22 may convert the commands to conform to a graphics application programming interface (API), such as, e.g., an Open Graphics Library (OpenGL®) API, an Open Graphics Library Embedded Systems (OpenGL ES) API, a DirectX API, an X3D API, a RenderMan API, a WebGL API, or any other public or proprietary standard graphics API.

As illustrated in FIG. 1, system memory 16 includes buffer 24 and buffer 26. Buffer 24 and buffer 26 may together form a command buffer in which graphics driver 22 stores commands that are to be executed by GPU 14. For instance, buffer 24 may be referred to as a first indirect buffer (IB1) and buffer 26 may be referred to as a second indirect buffer (IB2). Utilizing buffer 24 and buffer 26 to together form a command buffer may be a function of operating system 20 executing on processor 12. For instance, some operating systems, such as operating system 20, may limit the manner in which information can be stored the IB1 (e.g., buffer 24).

To overcome the limitations placed on IB1 by operating system 20, some techniques utilize an IB2 (e.g., buffer 26) to store information in a way that operating system 20 does not allow for IB1. In such techniques, IB1 stores references such as pointers to where information is stored in IB2, and IB2 stores the actual information. The techniques described in this disclosure are described with respect to an IB1 (e.g., buffer 24) and an IB2 (e.g., buffer 26) together forming a command buffer. However, requiring both buffer 24 and buffer 26 to form a command buffer may be a limitation of operating system 20. For an operating system, different than operating system 20, it may be possible to form a command buffer in a single buffer (e.g., in one of buffer 24 or buffer 26).

Accordingly, buffer 24 and buffer 26 together forming the command buffer is described for purposes of illustration and should not be considered limiting. For purposes of illustration, the techniques are described with processor 12, via graphics driver 22, storing commands in buffer 26, and storing information in buffer 24 indicating where the commands are located in buffer 26.

As described above, the techniques described in this disclosure are related to storing commands in a command buffer (e.g., buffer 24 and buffer 26). One example of commands is atomic commands. Atomic commands are a set of commands that need to be executed together. For example, GPU 14 may retrieve the atomic commands together for execution. During the execution of the atomic commands, GPU 14 may not execute other commands. For instance, GPU 14 may not pause the execution of commands of the atomic commands, execute another set of commands, and execute the remaining commands of the atomic commands. Because GPU 14 may execute atomic commands together, it may be desirable to store atomic commands together allowing GPU 14 to retrieve the atomic commands together for execution.

For purposes of illustration, the techniques of this disclosure are described with respect to a set of commands that need to be executed together. For instance, the set of commands forms atomic commands. The term "atomic operations" is another term synonymous with atomic commands. However, the techniques described in this disclosure should not be considered limited to atomic commands or operations, and are generally applicable for storing commands in a command buffer.

To store commands in buffer 26, operating system 20 may allocate memory space in buffer 26, and graphics driver 22 may store the commands in the allocated memory space in buffer 26. In the techniques described in this disclosure, the allocated memory space in buffer 26 may be in form of a plurality of memory units. Each memory unit may be able to store a certain amount of commands.

In some examples, processor 12, via operating system 20, may allocate a first memory unit in buffer 26, and processor 12, via graphics driver 22, may write commands of a set of commands to the first memory unit. If there are additional commands in the set of commands that need to be written, processor 12, via operating system 20, may allocate a second memory unit in buffer 26, and processor 12, via graphics driver 22, may write additional commands of the set of commands to the second memory unit, and so forth until processor 12, via graphics driver 22, completes the writing of the set of commands.

In these examples, graphics driver 22 may store pointer information in buffer 24 that indicates where the first memory unit, the second memory unit, and so forth are located in buffer 26. For example, the pointer information may be four bytes. In this sense, the first memory unit, the second memory unit, and any additional memory units needed to store the set of commands in buffer 26 may be considered conceptually as forming a chain of memory units. It should be understood that the first memory unit and the second memory unit need not necessarily be stored in contiguous locations within buffer 26. Rather, with the pointer information in buffer 24, GPU 14 may be able to retrieve the set of commands, stored across the different memory units in buffer 26, together.

Graphics driver 22 may define a maximum number of memory units that can be chained together (e.g., define a chain size). The chain size may be user configurable based on various factors such as the storage capabilities of system memory 16, an assumption as to the maximum number of commands in a set of commands, and the like. For example, application 18 may be configured with a maximum or minimum number of atomic commands that application 18 can issue, and graphics driver 22 may define the chain size based on the maximum or minimum number of atomic commands that application 18 can issue. As one example, application 18 may issue atomic commands that require at least two memory units, meaning that the minimum chain size may be two memory units. For purposes of illustration, this disclosure describes a chain size of four memory units. However, the chain size may be greater than or less than four memory units.

The commands of the set of commands may be associated with handles. A handle is a reference to an allocation of memory needed to process the associated command. In general, handles may be considered as descriptors for the data operated on by the commands. For instance, a command of a set of commands may operate on a set of input graphics data, and the result of the operation on the input graphics data may be a set of output graphics data. The handle associated with the command may indicate the amount of memory that needs to be allocated for the input graphics data and the output graphics data. As one example, a command may instruct GPU 14 to perform operations on texture data. In this example, the texture data may be handles associated with the command.

Processor 12, via operating system 20, may be configured to maintain an allocation list of handles for the set of commands. In some examples, system memory 16 may include operating system (OS) buffer 27 which stores the handles associated with the set of commands. OS buffer 27 is not necessary in every example, and processor 12 may implement any technique for maintaining the allocation list of handles.

When processor 12, via graphics driver 22, is to write a set of commands, processor 12, via operating system 20, may create an allocation list for the handles associated with the set of commands. The allocation list may be a fixed-sized array that indicates the handles associated with the commands. As processor 12, via graphics driver 22, writes the set of commands to the memory units in the chain of memory units, processor 12, via graphics driver 22, may also update the allocation list with the handles associated with the commands of the set of commands.

As graphics driver 22 writes commands to the memory units of the chain of memory units and associated handles to the allocation list, the memory units of the chain of memory units and the allocation list starts to become full, and may not be able to store additional commands or handles. As one example, graphics driver 22 may write a first set of commands to memory units of a chain of memory units. After writing the first set of commands to the memory units of the chain, if graphics driver 22 were to write commands of a second set of commands to the memory units, all four memory units of the chain would be full and there would still be commands of the second set of commands that need to be written. In this case, operating system 20 may not be able to allocate another memory unit because the chain size of the chain is four memory units.

As another example, graphics driver 22 may write a first set of commands to memory units of a chain of memory units and store information of the handles associated with the first set of commands in the allocation list. In this example, there may be sufficient space in the memory units to store a second set of commands. However, there may not be sufficient space in the allocation list to store the handles associated with the second set of commands.

In some other techniques, a graphics driver, unlike graphics driver 22, may first determine the amount of space needed to write a set of commands in the memory units of a chain, determine the amount of space needed for the handles associated with the set of commands, determine the amount of available space in the memory units of the chain of memory units, and determine the amount of available space in the allocation list. For example, the graphics driver, in these other techniques, may call a VerifySpace/VerifyHandleSpace function to determine the amount of space needed to write a set of commands in the memory units of a chain, determine the amount of space needed for the handles associated with the set of commands, determine the amount of available space in the memory units of the chain of memory units, and determine the amount of available space in the allocation list.

In these other examples, the graphics driver would only write the commands to the memory units when there is sufficient space in the memory units and the allocation list. If there is not sufficient space in the memory units or the allocation list, the graphics driver, in these other techniques, may execute a flush call. A flush call is described in more detail below.

There may be limitations with a graphics driver, determining, prior to the writing of the commands, the amount of space needed to write a set of commands in the memory units of a chain, the amount of space needed for the handles associated with the set of commands, the amount of available space in the memory units of the chain of memory units, and the amount of available space in the allocation list. For example, it may be possible for certain types of application 18 and for certain scenarios, that processor 12 needs to expend an undesirable amount of processing resources for executing the VerifySpace/VerifyHandleSpace function.

The execution of the VerifySpace/VerifyHandleSpace function may be considered as a small batch problem. For instance, the amount of commands and handles that need to be written may be relatively small as compared to the vast amount of storage area that processor 12 needs to check to determine whether there is sufficient space to store the commands and handles. In other words, the VerifySpace/VerifyHandleSpace function may check a relatively large amount of storage area to ensure that a small amount of data can be written, which may result in processing inefficiencies.

The techniques described in this disclosure describe a confirm-based command buffer queue generation technique in which processor 12, via graphics driver 22, may attempt to write a set of commands to buffer 26. If during the writing of the set of commands, processor 12, via graphics driver 22, determines that there is not sufficient space in the memory units of the chain of memory units to store the set of commands, then processor 12, via graphics driver 22, may execute a flush call.

In this way, graphics driver 22 may not need to execute the VerifySpace function to determine ahead of time whether there is sufficient space in the memory units of the chain of memory units to store the commands of the set of commands. In other words, by writing the commands of the set of commands without determining a priori whether there is sufficient space in the memory units of the chain of memory units in the command buffer (e.g., buffer 26), the techniques described in this disclosure may promote processing efficiencies because processor 12 may not need to waste processing resources determining whether there is sufficient space in the memory units of the chain of memory units to store the set of commands.

Also, in the techniques described in this disclosure, processor 12, via graphics driver 22, may determine after the writing of the set of commands whether there is sufficient space in the allocation list for the handles associated with the set of commands. If there is not sufficient space in the allocation list after the writing of the set of commands, processor 12, via graphics driver 22, may execute a flush call.

In this way, graphics driver 22 may not need to execute the VerifyHandle function to determine ahead of time whether there is sufficient space in the allocation list for the handles associated with the set of commands. In other words, by writing the commands of the set of commands without determining a priori whether there is sufficient space in the allocation list for the handles associated with the set of commands, the techniques described in this disclosure may promote processing efficiencies because processor 12 may not need to waste processing resources determining whether there is sufficient space in the allocation list for the handles associated with the set of commands.

As described above, if during the writing of the set of commands, graphics driver 22 determines that there is not sufficient space in the memory units of the chain of memory units in the command buffer, or if after the writing of the set of commands, graphics driver 22 determines that there is not sufficient space in the allocation list for the handles associated with the set of commands, graphics driver 22 may execute the flush call. The flush call may be the mechanism by which graphics driver 22 frees space to write commands in memory units or frees space in the allocation list for the handles associated with the commands.

For example, the result of the execution of the flush call may be that graphics driver 22 submits already written commands, for which there is sufficient space in the allocation list, to GPU 14 for eventual execution. For instance, the submission of the commands means that GPU 14 may be able to execute the commands. As one example, graphics driver 22 may indicate to GPU 14 the memory addresses for the memory units that store commands so that GPU 14 can retrieve the commands for eventual execution as a way to submit the commands to GPU 14. In general, submitting commands may be considered as graphics driver 22 utilizing any technique to make the commands available to GPU 14 for eventual execution. GPU 14 may immediately execute the commands, or execute the commands at some later time based on when GPU 14 is to execute the commands.

In addition, the result of the execution of the flush call may be graphics driver 22 releasing memory units from the chain of memory units that store already written commands. For example, assume that processor 12, via graphics driver 22, wrote a first set of commands that filled up a first memory unit and a second memory unit, and partially filled up a third memory unit. Also, assume that in this example there was sufficient space in the allocation list for the handles associated with the first set of commands.

In this example, processor 12, via graphics driver 22, may begin writing a second set of commands starting from where processor 12 finished writing the first set of commands in the third memory unit. For instance, the first set of commands may be considered as a previous set of commands, and the second set of commands may be considered as a current set of commands. However, in this example, processor 12 may not be able to write all of the commands of the second (e.g., current) set of commands in the remaining of the third memory unit and a fourth memory unit. In this example, the chain size may be four memory units and so graphics driver 22 may not be able to link a memory unit after the fourth memory unit in the chain of memory units.

After graphics driver 22 fills up the fourth memory unit with commands from the second set of commands, processor 12, via graphics driver 22, may execute the flush call. In response, processor 12, via graphics driver 22, may submit the first set of commands to GPU 14 for eventual execution (e.g., make available by indicating the locations of where the first set of commands are stored). The commands of the second set of commands that processor 12, via graphics driver 22, was able to write in the memory units remain in the memory units, and are not yet submitted to GPU 14.

Also, in response to the execution of the flush call, processor 12, via graphics driver 22, may release the first memory unit and the second memory unit from the chain of memory units because the first memory unit and the second memory unit stored commands only of the first set of commands. Releasing a memory unit from the chain of memory units may mean breaking the link of the memory unit with the other memory units in the chain. Processor 12, via graphics driver 22, may not be able to release the third memory unit from the chain of memory units because at least part of the third memory unit stores commands of the second set of memory unit.

With the release of the first memory unit and the second memory unit from the chain of memory units, the chain of memory units may include two memory units (e.g., the third memory unit and the fourth memory unit). Because the chain size is four memory units, in this example, operating system 20 may allocate another memory unit in buffer 26, and graphics driver 22 may link this new memory unit to the end of the previous fourth memory unit.

At this juncture, there may be three memory units in the chain of memory units (i.e., the previous third and fourth memory units and the newly linked memory unit). Graphics driver 22 may then write remaining commands of the second set of commands (i.e., command remaining after graphics driver 22 filled up the fourth memory unit) in the newly linked memory unit. If graphics driver 22 is not able to write all of the remaining commands of the second set of commands in the newly linked memory unit, operating system 20 may allocate another memory unit in buffer 26, and graphics driver 22 may link this new memory unit to the three memory units of the chain of memory units, resulting in a chain of memory units with four memory units, which is the chain size.

Moreover, the execution of the flush call results in a resetting of the allocation list for the handles. For example, in addition to submitting the first set of commands for eventual execution by GPU 14, processor 12, via graphics driver 22, may clear the allocation list, and store the handles associated with the second set of commands in the allocation list.

In the above example, it was assumed that after writing the first set of commands there was sufficient space in the allocation list for the handles associated with the first set of commands. Also, in the above example, processor 12, via graphics driver 22, determined which commands to submit as part of the flush call. The following describes the manner in which processor 12, via graphics driver 22, may determine whether there is sufficient space in the allocation list for the associated handles, as well as the manner in which processor 12, via graphics driver 22, may determine which commands to submit as part of the flush call.

For example, during the writing of a set of commands, graphics driver 22 may periodically trigger a GetCmdSpace function, without prior verification of whether there is sufficient space in the memory units for the set of commands. The GetCmdSpace function may indicate whether graphics driver 22 has reached the end of a memory unit which is at the end of the chain of memory units (i.e., whether graphics driver 22 has reached the fourth memory unit of the chain of memory units with a chain size of four memory units). If the GetCmdSpace function indicates that graphics driver 22 has not yet reached the end of the chain of memory units, graphics driver 22 may keep writing commands of the first set of commands.

If the GetCmdSpace function indicates that graphics driver 22 has reached the end of the chain of memory units, graphics driver 22 may execute the flush call as described above. Also, graphics driver 22 may then re-try the GetCmdSpace function. For example, the flush call may free space for linking additional memory units that operating system 20 allocates, and graphics driver 22 may then re-try the GetCmdSpace function, which will indicate that graphics driver 22 has not yet reached the end of the chain of memory units.

However, in some cases, graphics driver 22 may finish writing the commands of the set of commands and there may still be available space in the memory units for additional commands from a subsequent set of commands. In this case, processor 12, via graphics driver 22, may execute a "confirm-write" command (referred to as ConfirmWrite). In general, processor 12, via graphics driver 22, may execute the confirm-write command after writing the commands of the set of commands to the command buffer. The execution of the confirm-write command may serve one or more purposes.

Graphics driver 22, with the execution of the confirm-write command, may indicate the point in the memory unit where graphics driver 22 finished writing the set of commands so that graphics driver 22 can start writing commands for the next set of commands starting from the point in the memory unit where graphics driver 22 finished writing the set of commands. The location of an end of the set of commands in the memory unit is referred to as a "confirm point."

For example, assume that processor 12, via graphics driver 22, wrote commands of a first set of commands in a first memory unit, a second memory unit, and partially in a third memory unit. In this example, processor 12, via graphics driver 22, may identify the confirm point in the third memory unit where graphics driver 22 finished writing the first set of commands (e.g., the previous set of commands). For example, where graphics driver 22 finished writing the first set of commands in the third memory unit is the location of the end of the first set of commands in the third memory unit. In this case, after the identifying the confirm point, the first set of commands may be considered as previously confirmed commands. When writing a second set of commands (which are now the current set of commands), processor 12, via graphics driver 22, may begin writing the second set of commands starting from the confirm point in the third memory unit.

In addition, graphics driver 22, with the execution of the confirm-write command, may determine whether there is sufficient space in the allocation list for handles associated with the commands of the set of commands. For example, as graphics driver 22 is writing commands of a set of commands, processor 12, via graphics driver 22, may execute the AddPendingHandle( ) function. With the AddPendingHandle function, graphics driver 22 may add handles associated with the set of commands to a temporary allocation list, also referred to as an unconfirmed handles list.

After writing the set of commands, the unconfirmed handles list includes the handles associated with the set of commands. Graphics driver 22 may then attempt to submit the handles in the unconfirmed handles list to operating system 20. For example, processor 12, via graphics driver 22, may execute the AddHandle( ) function. With the AddHandle( ) function, graphics driver 22 may submit the handles in the unconfirmed handles list to operating system 20. In response, processor 12, via operating system 20, may determine whether there is sufficient space in the allocation list for the handles of the unconfirmed handles list.

For example, the allocation list may include handles of a previous set of commands, and assume that the handles of the previous set of commands use 90% of the array of the allocation list. In this example, graphics driver 22 may submit handles in the unconfirmed handles list, and if the handles in the unconfirmed handles list require less than 10% of the allocation list, graphics driver 22 may store the handles in the unconfirmed handles list in the allocation list. In some examples, graphics driver 22 may attempt to store the handles in the unconfirmed handle list into the allocation list without first determining whether there is sufficient space in the allocation list for the handles form the unconfirmed handle list.

If, however, the handles in the unconfirmed handle list require more than 10% of the allocation list (e.g., the attempt to store the handles in the unconfirmed handle list into the allocation list was unsuccessful), graphics driver 22 may execute a flush call. In response to the flush call, processor 12, via graphics driver 22, may submit the commands stored in the command buffer for which the allocation list currently stores the associate handles and associated handles in the allocation list to GPU 14 for eventual execution. Also, in response to the flush call, processor 12, via operating system 20, may reset the allocation list (i.e., clear out the allocation list with the handles), which in turn allows graphics driver 22 to store the handles associated with the just written set of commands in the allocation list.

In this way, the execution of the confirm-write command may be considered as indicating which commands and associated handles can be submitted to GPU 14 in response to a flush call. For example, assume that as graphics driver 22 is writing a first set of commands, graphics driver 22 is maintaining the unconfirmed list of handles (e.g., via the AddPendingHandle( ) function). Also, assume that graphics driver 22 is able to write all commands of the first set of commands within the memory units of the chain of memory units.

In this example, after writing the first set of commands, graphics driver 22 may execute the confirm-write (ConfirmWrite) command. As part of the confirm-write command, graphics driver 22 may submit the unconfirmed list of handles to operating system 20 (e.g., via AddHandle( ) function). In this example, assume that there is sufficient space in the allocation list for the handles of the unconfirmed list of handles. Accordingly, graphics driver 22 may add the handles of the unconfirmed list of handles to the allocation list and clear the unconfirmed list of handles. Because graphics driver 22 was able to add the handles of the unconfirmed list of handles to the allocation list, as part of the confirm-write command, graphics driver 22 may identify the point (i.e., confirm point) where graphics driver 22 finished writing the first set of commands. For examples, graphics driver 22 may identify the confirm point at a location of an end of the first set of commands in the memory unit. Processor 12, via graphics driver 22, may not yet submit the first set of commands, and may wait until a flush call.

At this juncture, processor 12 may be considered as having written a frame. The term frame, as used in this disclosure, is used synonymous with a set of commands. The term frame should not be confused with rendered image, which is also sometimes referred to as a frame.

In the techniques described in this disclosure, after processor 12, via graphics driver 22, executes the confirm-write command, and the execution of the confirm-write command is successful (i.e., there is sufficient space in the allocation list), processor 12, via graphics driver 22, may indicate that the first set of commands are "confirmed commands." Processor 12, via graphics driver 22, may also identify which memory units store only confirmed commands.

For example, assume that processor 12, via graphics driver 22, filled a first memory unit, a second memory unit, and partially filled a third memory unit of the chain of memory units with the first set of commands. In this example, the first memory unit and the second memory unit only store confirmed commands, and graphics driver 22 may indicate that the first memory units and the second memory unit include only confirmed commands. For instance, graphics driver 22 may maintain a variable usedEntries for each memory unit of the chain of memory units.

For memory units that only store confirmed commands, graphics driver 22, for those memory units, may set the variable usedEntries equal to confirmedEntries. In this example, for the first memory unit and the second memory unit, graphics driver 22 may set the variable usedEntries equal to confirmedEntries to indicate that the first memory unit and the second memory unit only store confirmed commands. With respect to the third memory unit, graphics driver 22 may set the variable usedEntries to not confirmedEntries (i.e., usedEntries !=confirmedEntries). This may be because the third memory unit only partially includes confirmed commands.

Processor 12, via graphic driver 22, may then write a second set of commands to the memory units of the chain of memory units starting from the confirm point. For example, if the first set of commands is frame 0, processor 12, via graphics driver 22, may write frame 1, which is the second set of commands to the memory units of the chain of memory units starting from the confirm point.

During the writing of the second set of commands, graphics driver 22 may store the handles associated with the second set of commands in the unconfirmed list of handles. If, during the writing of the second set of commands, graphics driver 22 reaches the end of the chain of memory units and there are commands of the second set of commands that have not yet been written, graphics driver 22 may execute the flush call.

In response, graphics driver 22 may submit all confirmed commands and handles associated with the confirmed commands (e.g., submit the first set of commands and the handles in the allocation list associated with the first set of commands). In other words, graphics driver 22 may submit all commands prior to the confirm point and their associated handles. For instance, keeping with the previous example, graphics driver 22 may submit all commands in the first and second memory units, and the confirmed commands that partially fill up the third memory unit up to the confirm point. Graphics driver 22 may also submit the handles in the allocation list and clear the allocation list.

Graphics driver 22 may also release the first and second memory units from the chain of memory units, and write the remaining commands of the second set of commands in additional memory units allocated by operating system 20. For memory units that do not store any confirmed commands, graphics driver 22 may set the variable confirmedEntries, for those memory units, equal to 0. Graphics driver 22 may then execute the confirm-write command, after writing the second set of commands. In this case, because graphics driver 22 cleared the allocation list after flushing the first set of commands, there will be sufficient space in the allocation list for the handles associated with the second set of commands, which are temporally stored in the unconfirmed list of handles. Also, in response to the confirm-write command, the second set of commands may be considered as confirmed commands, and graphics driver 22 may move the confirm point to the end of where graphics driver 22 finished writing the second set of commands.

In the above case, during the writing of the second set of commands, graphics driver 22 reached the end of the chain of memory units with commands of the second set of commands that have not yet been written to the chain of memory units. In some examples, graphics driver 22 may write all commands of the second set of commands and still not reach the end of the chain of memory units. In these examples, because graphics driver 22 is able to write all commands of the second set of commands and still not reach the end of the chain of memory units, graphics driver 22 may not execute a flush call, and may, therefore, not submit the first set of commands (i.e., confirmed commands) and may not clear the allocation list of handles associated with the first set of commands.

Also, in these examples, after writing all commands of the second set of commands, processor 12, via graphics driver 22, may execute the confirm-write command. As part of the confirm-write command, graphics driver 22 may attempt to add the handles in the unconfirmed list of handles to the allocation list. In this case, the allocation list may include the handles associated with the first set of commands. If adding the handles of the second set of commands in the unconfirmed list of handles does not require the allocation list to store more handles than its fixed-size will allow, graphics driver 22 add the handles of the second set of commands to the allocation list, clear the unconfirmed list of handles, and move the confirm point to the end of the second set of commands.

If adding the handles of the second set of commands in the unconfirmed list of handles requires the allocation list to store more handles than its fixed-size will allow, graphics driver 22 may execute the flush call. In response, graphics driver 22 may submit all confirmed commands (e.g., the first set of commands) and the associated handles, clear the allocation list, and release memory units that only store confirmed commands. Graphics driver 22 may then store handles of the second set of commands in the just cleared allocation list of handles, move the confirm point to the end of the second set of commands, and indicate that the second set of commands are confirmed commands.

Figure 2:
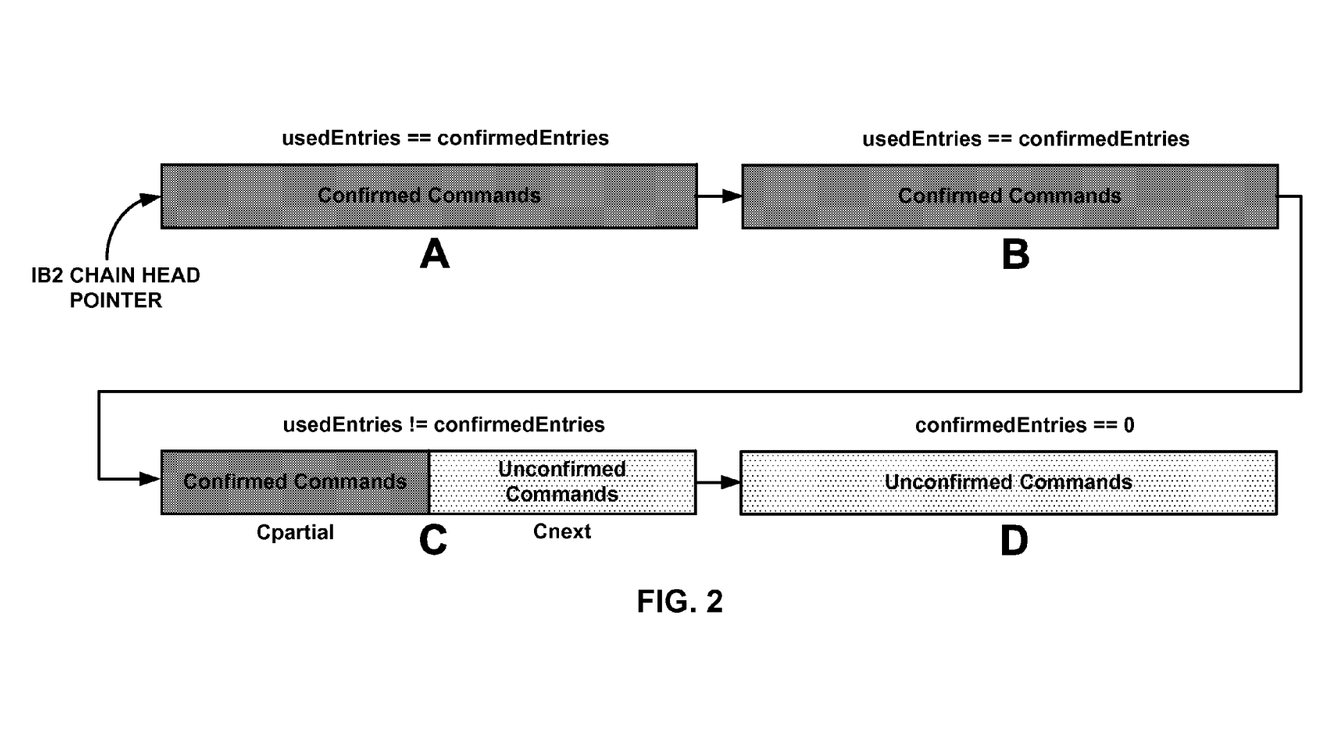
FIG. 2 is a conceptual diagram illustrating confirmed commands and unconfirmed commands stored in a command buffer in accordance with one or more example techniques described in this disclosure.
Figure 3:
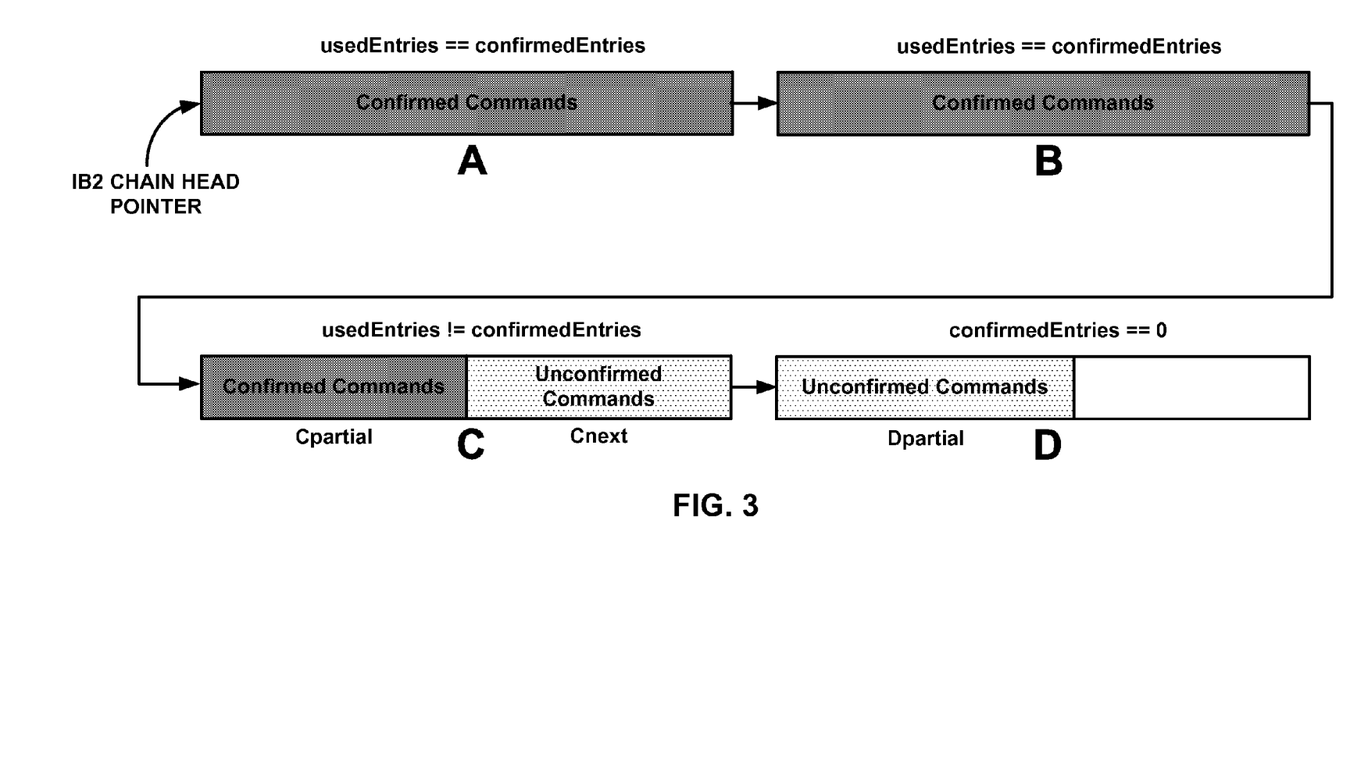
FIG. 3 is another conceptual diagram illustrating confirmed commands and unconfirmed commands stored in a command buffer in accordance with one or more example techniques described in this disclosure.

FIG. 2 is a conceptual diagram illustrating confirmed commands and unconfirmed commands stored in a command buffer in accordance with one or more example techniques described in this disclosure. FIG. 3 is another conceptual diagram illustrating confirmed commands and unconfirmed commands stored in a command buffer in accordance with one or more example techniques described in this disclosure. FIG. 2 illustrates the example case where graphics driver 22 executes a flush call because graphics driver 22 filled up the memory units of a chain of memory units with there being additional commands in a set of commands that have not yet been written. FIG. 3 illustrates the example case where graphics driver 22 writes all commands of a set of commands, but executes a flush call because of lack of space in the allocation list.

For example, in FIGS. 2 and 3, the chain of memory units includes memory unit A, memory unit B, memory unit C, and memory unit D. Graphics driver 22 may reference to memory units A, B, C, and D via their respective pointers that identify the location in buffer 26 where memory units A, B, C, and D reside. For example, FIGS. 2 and 3 illustrate the IB2 chain head pointer which points to the first memory unit (e.g., memory unit A) in the chain of memory units. Operating system 20 may store the information for IB2 chain head pointer in buffer 24 (e.g., the IB1 buffer), and memory units A, B, C, and D may reside in buffer 26.

In FIGS. 2 and 3, graphics driver 22 may write a first set of commands in memory unit A, memory unit B, and partially in memory unit C (indicated by Cpartial). After the writing of the first set of commands, graphics driver 22 may execute the confirm-write command. In the examples in FIGS. 2 and 3, graphics driver 22 was able to store the handles associated with the first set of commands in the allocation list. In the examples in FIGS. 2 and 3, graphics driver 22 may identify the confirm point in the middle of memory unit C (e.g., at the end of Cpartial).

Because graphics driver 22 was able to write all commands of the first set of commands in the memory units of the chain of memory units and was able to store the handles associated with the first set of commands in the allocation list, the first set of commands may be considered as confirmed commands, as illustrated with the gray shading. Also, as illustrated, because memory units A and B store only confirmed commands, graphics driver 22 may set the usedEntries variable equal to confirmedEntries. Because memory unit C only partially stores confirmed commands, graphics driver 22 may set the usedEntries variable not equal to confirmedEntries.

In FIGS. 2 and 3, graphics driver 22 may then write a second set of commands to chain of memory units starting from the confirm point. For example, graphics driver 22 may maintain a pointer that indicates where graphics driver 22 is to begin writing the set of commands (referred to as a start pointer). Initially, the start pointer points to the IB2 chain head pointer. After a successful execution of a confirm-write command, graphics driver 22 may move the start pointer to confirm point. For example, in FIGS. 2 and 3, graphics driver 22 may move the start pointer to at the end of Cpartial.

In FIGS. 2 and 3, the writing of the second set of commands is illustrated with the unconfirmed commands. The second set of commands are unconfirmed commands because graphics driver 22 has not yet successfully executed a confirm-write command. In FIGS. 2 and 3, graphics driver 22 needs to write commands of the second set of commands that fill up memory unit C (Cnext) and that fill up (in FIG. 2) or partially fill up (in FIG. 3) memory unit D. Because memory unit D only stores unconfirmed commands, the confirmedEntries for memory unit D is set equal to 0.

In FIG. 2, graphics driver 22 may write the second set of commands and reach the end of the chain of memory units with there still being commands in the set of commands that have not yet been written. In this case, graphics driver 22 may execute the flush call, and may submit all confirmed commands to GPU 14 for eventual execution.

In FIG. 3, graphics driver 22 was able to write all commands of the second set of commands within the chain of memory units (i.e., memory unit D is only filled until Dpartial). In FIG. 3, graphics driver 22 may execute the confirm-write call; however, in this case, there may not be sufficient space in the allocation list for the handles associated with the second set of commands. For instance, during the writing of the second set of commands, graphics driver 22 may temporally store the handles associated with the second set of commands in the unconfirmed list of handles. With the execution of the confirm-write command, graphics driver 22 may attempt to add the handles in the unconfirmed handles list to the allocation list. However, the allocation list may already include the handles associated with the first set of commands (i.e., confirmed commands) and there may not be sufficient space in the allocation list for graphics driver 22 to add the handles associated with the second set of commands to the allocation list. In this case, graphics driver 22 may execute the flush call, and may submit all confirmed commands and associated handles to GPU 14 for eventual execution.

In some examples, as part of submitting the confirmed commands, graphics driver 22 may indicate to GPU 14 the location of the start pointer and the respective pointers for the memory units that store the confirmed commands. In addition, graphics driver 22 may indicate to GPU 14 the pointer that points to the confirm point. GPU 14 may then be able to retrieve all of the confirmed commands from the command buffer (e.g., buffer 26) together based on the indicated pointers. After graphics driver 22 confirms the next set of commands, the pointer that points to the current confirm point becomes the start pointer for the next set of commands and the newly determined confirm point (i.e., where graphics driver 22 finished writing the second set of commands) becomes the end point of the confirmed commands.

In this manner, the techniques utilize a confirm-based methodology to indicate which commands are ready to be submitted to GPU 14 for eventual execution. The confirm-based methodology allows graphics driver 22 to write commands to the command buffer without needing to determine ahead of time whether there is sufficient space in the memory units to store the commands or sufficient space in the allocation list for the handles. It is when graphics driver 22 determines during the writing of the commands that there is not sufficient space in the memory units that graphics driver 22 executes the flush call, rather than issuing the flush call prior to writing the commands. Also, it is when graphics driver 22 determines after the writing of the commands that there is not sufficient space in the allocation list for the handles associated with the commands that graphics driver 22 executes the flush call, rather than issuing the flush call prior to writing the commands.

Figure 4:
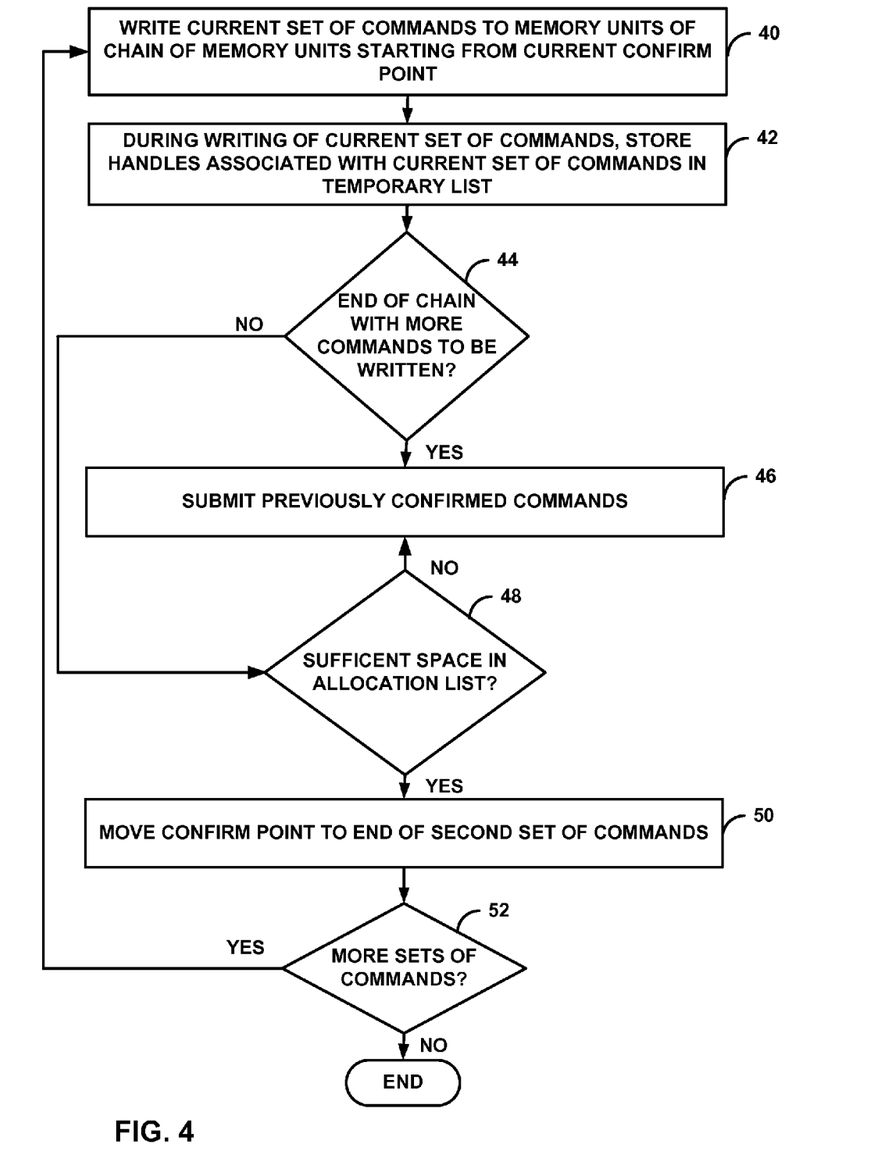
FIG. 4 is a flowchart illustrating an example operation in accordance with one or more example techniques described in this disclosure.

FIG. 4 is a flowchart illustrating an example operation in accordance with one or more example techniques described in this disclosure. For purposes of illustration, the techniques are described with reference to FIG. 1.

Processor 12, via graphics driver 22, may write a current set of commands to memory units of a chain of memory units of a command buffer starting from a current confirm point (40). For example, prior to writing the current set of commands, processor 12 may have written a previous set of commands to the chain of memory units and may have also written handles associated with the previous set of commands to a temporary list (e.g., in an unconfirmed handle list).

After writing the previous set of commands, processor 12 may have executed a confirm-write (e.g., ConfirmWrite) command. In this example, assume that during the writing of the previous set of commands, there was sufficient space in the chain of memory units to store all of the previous set of commands without reaching the end of the chain of memory units (e.g., there are no commands of the previous set of commands that were not written to the chain of memory unit). As part of the execution of the confirm-write command, processor 12 may have stored the handles in the temporary list into the allocation list (e.g., there was sufficient space in the allocation list for the handles of the previous set of commands). In this example, as part of the execution of the confirm-write command, processor 12 may identify a current confirm point which is the point in a memory unit where processor 12 finished writing the previous set of commands. Therefore, for the current set of commands, processor 12 may start writing the commands of the current set of commands from the current confirm point.

Processor 12, via graphics driver 22, may store handles associated with the current set of commands in a temporary list (e.g., in an unconfirmed handle list) during the writing of the current set of commands (42). For example, processor 12 may create a new temporary list and store handles associated with the current set of commands in this newly created temporary list. As another example, processor 12 may clear the previous temporary list, and store handles associated with the current set of commands in this now cleared temporary list. For instance, after storing the handles associated with the previous set of commands from the temporary list into the allocation list, processor 12 may clear the temporary list allowing processor 12 to store handles associated with the current set of commands in the temporary list.

As illustrated, processor 12, via graphics driver 22, may determine whether an end of the chain of memory units is reached with commands of the current set of commands that have not yet been written to the chain of memory units during the writing of the current set of commands (44). If, processor 12, via graphics driver 22, reaches the end of the chain of memory units with commands of the current set of commands that have not yet been written (YES of 44), processor 12, via graphics driver 22, may submit the previously confirmed commands for eventual execution (46).

For example, the previously confirmed commands may be commands prior to the current confirm point that were previously stored in the chain of memory units by processor 12 (e.g., the previous set of commands). For instance, the previously confirmed commands may be the previous set of commands that were stored by processor 12 in the chain of memory units before the writing of the current set of commands for which processor 12 was able to confirm that there was sufficient space in the chain of memory units and that there was sufficient space in the allocation list to store the handles associated with the previous set of commands.

If, processor 12, via graphics driver 22, does not reach the end of the chain of memory units after writing the current set of commands (NO of 44), processor 12, via graphics driver 22, may determine whether there is sufficient space in an allocation list to store handles associated with the current set of commands (48). For example, processor 12, via graphics driver 22, may determine whether adding the handles in the temporary list to the allocation list requires more space in the allocation list than available.

As one example, processor 12 may execute a confirm-write command, as part of the execution, processor 12 may attempt to add the handles in the temporary list to the allocation list. If the addition of the handles is unsuccessful, processor 12 may determine that adding the handles in the temporary list to the allocation list requires more space in the allocation than available. If the addition of the handles is successful, processor 12 may determine that adding the handles in the temporary list to the allocation list does not require more space in the allocation list than available. In this way, processor 12 may not need to determine ahead of time whether there is sufficient space in the allocation list to store the handles in the temporary list, and may instead attempt, without first checking if there is sufficient space in the allocation list, to add handles in the temporary list to the allocation list.

If, processor 12, via graphics driver 22, determines that there is not sufficient space in the allocation list to store the handles associated with the current set of commands (NO of 48), processor 12, via graphics driver 22, may submit the previously confirmed commands for eventual execution, as described above (46). If, processor 12, via graphics driver 22, determines that there is sufficient space in the allocation list to store the handles associated with the current set of commands (YES of 48), processor 12, via graphics driver 22, may move the confirm point to the end of the current set of commands (50). In addition, graphics driver 22 may store the handles associated with the current set of commands in the allocation list.

Processor 12 may determine whether there is an additional set of commands that needs to be written to the command buffer (52). If there is an additional set of commands that needs to be written (YES of 52), the additional set of commands may be considered as the current set of commands, the current set of command may be considered as the previously confirmed commands, and the point to which processor 12 moved the confirm point may be considered as the current confirm point. Processor 12 may then write the current set of commands to memory units of the chain of memory units from the current confirm point (e.g., the newly moved to confirm point) (40). Processor 12 may then repeat the example steps illustrated in FIG. 4. If there is not an additional set of commands that needs to be written (NO of 52), processor 12 may end the writing of sets of commands until there is a set of commands that needs to be written.

Figure 5:
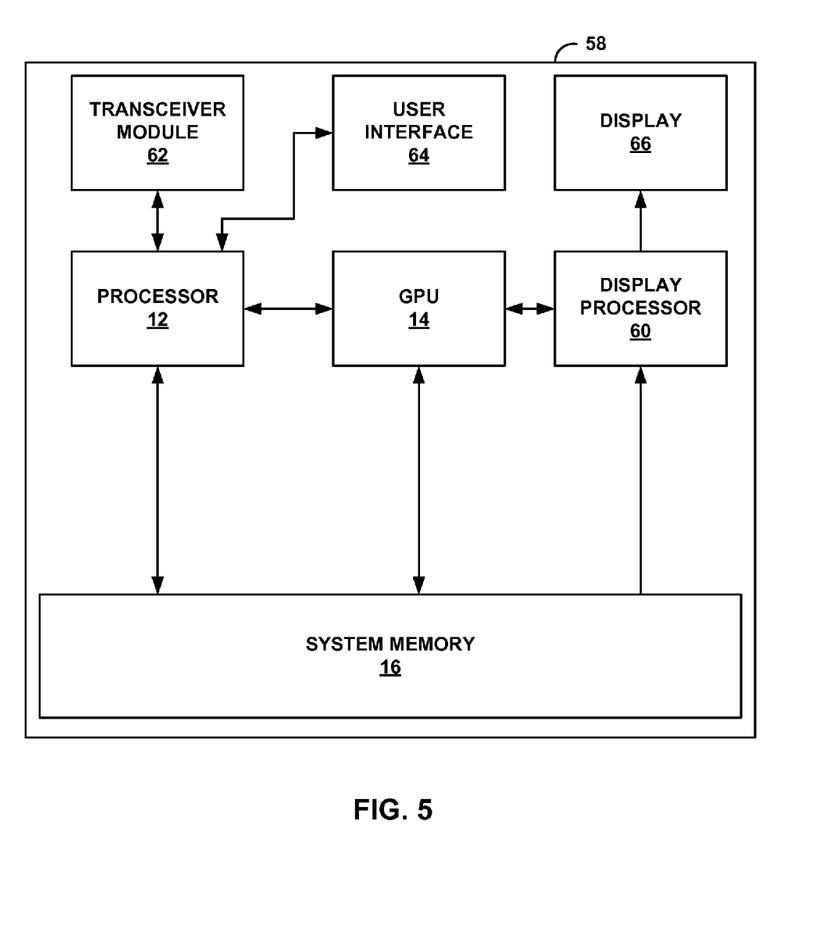
FIG. 5 is a block diagram illustrating a device that may be configured to implement one or more example techniques described in this disclosure.

FIG. 5 is a block diagram illustrating a device that may be configured to implement one or more example techniques described in this disclosure. For example, FIG. 5 illustrates an example device 58. Device 58 may be one example of device 10 of FIG. 1 illustrated in greater detail in FIG. 5. In the example of FIG. 5, device 58 may include processor 12, GPU 14, and system memory 16. For purposes of brevity, processor 12, GPU 14, and system memory 16 are not further described with respect to FIG. 5, as these components have been previously described with respect to FIG. 1. Device 58 may also include display processor 60, transceiver module 62, user interface 64, and display 66. Transceiver module 62 and display processor 60 may both be part of the same integrated circuit (IC) as processor 12 and/or GPU 14, may both be external to the IC or ICs that include processor 12 and/or GPU 14, or may be formed in the IC that is external to the IC that includes processor 12 and/or GPU 14.

Device 58 may include additional modules or units not shown in FIG. 5 for purposes of clarity. For example, device 58 may include a speaker and a microphone, neither of which are shown in FIG. 5, to effectuate telephonic communications in examples where device 58 is a mobile wireless telephone, or a speaker where device 58 is a media player. Device 58 may also include a video camera. Furthermore, the various modules and units shown in device 58 may not be necessary in every example of device 58. For example, user interface 64 and display 66 may be external to device 58 in examples where device 58 is a desktop computer or other device that is equipped to interface with an external user interface or display.

Examples of user interface 64 include, but are not limited to, a trackball, a mouse, a keyboard, and other types of input devices. User interface 64 may also be a touch screen and may be incorporated as a part of display 66. Transceiver module 62 may include circuitry to allow wireless or wired communication between device 58 and another device or a network. Transceiver module 62 may include modulators, demodulators, amplifiers and other such circuitry for wired or wireless communication.

In some examples, GPU 14 may store a fully formed image in system memory 16. Display processor 60 may retrieve the image from system memory 16 and output values that cause the pixels of display 66 to illuminate to display the image. Display 66 may be the display of device 10 that displays the image content generated by GPU 14. Display 66 may be a liquid crystal display (LCD), an organic light emitting diode display (OLED), a cathode ray tube (CRT) display, a plasma display, or another type of display device.

In one or more examples, the functions described may be implemented in hardware, software, firmware, or any combination thereof. If implemented in software, the functions may be stored on a computer-readable medium. Computer-readable media may include computer data storage media. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs (i.e., a chip set). Various components, modules or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method for storing commands, the method comprising:
   writing, with a processor, a current set of commands to a chain of memory units in a command buffer starting from a current confirm point in a memory unit of the chain of memory units, wherein the chain of memory units stores previously confirmed commands that the processor stored in the chain of memory units before the writing of the current set of commands, and wherein the previously confirmed commands have handles that are stored in an allocation list;
   determining, with the processor, at least one of:
      whether an end of the chain of memory units is reached with commands of the current set of commands that have not yet been written to the chain of memory units during the writing of the current set of commands; or
      whether there is sufficient space in the allocation list to store handles associated with the current set of commands after the writing of the current set of commands; and
   submitting for eventual execution, the previously confirmed commands that were stored by the processor in the chain of memory units before the writing of the current set of commands if, based on the determination, the end of the chain of memory units is reached with commands of the current set of commands that have not yet been written to the chain of memory units or if, based on the determination, there is insufficient space in the allocation list to store handles associated with the current set of commands.

2. The method of claim 1, further comprising:
storing the handles associated with the current set of commands in a temporary list during the writing of the current set of commands,
wherein determining whether there is sufficient space in the allocation list comprises determining whether adding the handles in the temporary list to the allocation list requires more space in the allocation list than available by attempting to add the handles in the temporary list to the allocation list.

3. The method of claim 1, further comprising:
storing the handles associated with the current set of commands in the allocation list if there is sufficient space in the allocation list to store the handles associated with the current set of commands after writing the current set of commands; and
moving the current confirm point to another memory unit if there is sufficient space in the allocation list to store the handles associated with the current set of commands after writing the current set of commands.

4. The method of claim 1, further comprising:
releasing memory units from the chain of memory units prior to the memory unit in which the current confirm point is identified; and
allocating one or more additional memory units to the chain of memory units if the end of the chain of memory units is reached with commands of the current set of commands that have not yet been written to the chain of memory units.

5. The method of claim 1, further comprising:
clearing the allocation list if there is not sufficient space in the allocation list to store the handles associated with the current set of commands.

6. The method of claim 1, wherein writing the current set of commands in the chain of memory units starting from the current confirm point in the memory unit comprises writing the current set of commands in the chain of memory units without determining whether there is sufficient space in the chain of memory units to store the current set of commands.

7. The method of claim 1, wherein writing the current set of commands in the chain of memory units starting from the current confirm point in the memory unit comprises writing the current set of commands in the chain of memory units without determining whether there is sufficient space in the allocation list to store the handles associated with the current set of commands.

8. The method of claim 1, wherein the processor comprises a first processor, and wherein the current set of commands are for execution by a second, different processor.

9. The method of claim 8, wherein the first processor comprises a central processing unit (CPU) and the second processor comprises a graphics processing unit (GPU).

10. A device comprising:
a system memory comprising a command buffer; and
a processor configured to:
write a current set of commands to a chain of memory units in the command buffer starting from a current confirm point in a memory unit of the chain of memory units, wherein the chain of memory units stores previously confirmed commands that the processor stored in the chain of memory units before the writing of the current set of commands, and wherein the previously confirmed commands have handles that are stored in an allocation list;
determine at least one of:
whether an end of the chain of memory units is reached with commands of the current set of commands that have not yet been written to the chain of memory units during the writing of the current set of commands; or
whether there is sufficient space in the allocation list to store handles associated with the current set of commands after the writing of the current set of commands; and
submit for eventual execution the previously confirmed commands that were stored by the processor in the chain of memory units before the writing of the current set of commands if, based on the determination, the end of the chain of memory units is reached with commands of the current set of commands that have not yet been written to the chain of memory units or if, based on the determination, there is insufficient space in the allocation list to store handles associated with the current set of commands.

11. The device of claim 10, wherein the processor is configured to:
store the handles associated with the current set of commands in a temporary list during the writing of the current set of commands,
wherein, to determine whether there is sufficient space in the allocation list, the processor is configured to determine whether adding the handles in the temporary list to the allocation list requires more space in the allocation list than available by attempting to add the handles in the temporary list to the allocation list.

12. The device of claim 10, wherein the processor is configured to:
store the handles associated with the current set of commands in the allocation list if there is sufficient space in the allocation list to store the handles associated with the current set of commands after writing the current set of commands; and
move the current confirm point to another memory unit if there is sufficient space in the allocation list to store the handles associated with the current set of commands after writing the current set of commands.

13. The device of claim 10, wherein the processor is configured to:
release memory units from the chain of memory units prior to the memory unit in which the current confirm point is identified; and
allocate one or more additional memory units to the chain of memory units if the end of the chain of memory units is reached with commands of the current set of commands that have not yet been written to the chain of memory units.

14. The device of claim 10, wherein the processor is configured to:
clear the allocation list if there is not sufficient space in the allocation list to store the handles associated with the current set of commands.

15. The device of claim 10, wherein the processor is configured to write the current set of commands in the chain of memory units without determining whether there is sufficient space in the chain of memory units to store the current set of commands.

16. The device of claim 10, wherein the processor is configured to write the current set of commands in the chain of memory units without determining whether there is sufficient space in the allocation list to store the handles associated with the current set of commands.

17. The device of claim 10, wherein the processor comprises a first processor, the device further comprising a second, different processor, and wherein the current set of commands are for execution by the second processor.

18. The device of 17, wherein the first processor comprises a central processing unit (CPU) and the second processor comprises a graphics processing unit (GPU).

19. A non-transitory computer-readable storage medium having instructions stored thereon that when executed cause one or more processors to:
write a current set of commands to a chain of memory units in a command buffer starting from a current confirm point in a memory unit of the chain of memory units, wherein the chain of memory units stores previously confirmed commands that the one or more processors stored in the chain of memory unit before the writing of the current set of commands, and wherein the previously confirmed commands have handles that are stored in an allocation list;
determine at least one of:
whether an end of the chain of memory units is reached with commands of the current set of commands that have not yet been written to the chain of memory units during the writing of the current set of commands; or
whether there is sufficient space in an allocation list to store handles associated with the current set of commands after the writing of the current set of commands; and
submit for eventual execution the previously confirmed commands that were stored by the one or more processors in the chain of memory units before the writing of the current set of commands if, based on the determination, the end of the chain of memory units is reached with commands of the current set of commands that have not yet been written to the chain of memory units or if, based on the determination, there is insufficient space in the allocation list to store handles associated with the current set of commands.

20. The computer-readable storage medium of claim 19, further comprising instructions that cause the one or more processors to:
store the handles associated with the current set of commands in a temporary list during the writing of the current set of commands,
wherein the instructions that cause the one or more processors to determine whether there is sufficient space in the allocation list comprise instructions that cause the one or more processors to determine whether adding the handles in the temporary list to the allocation list requires more space in the allocation list than available by attempting to add the handles in the temporary list to the allocation list.

21. The computer-readable storage medium of claim 19, further comprising instructions that cause the one or more processors to:
store the handles associated with the current set of commands in the allocation list if there is sufficient space in the allocation list to store the handles associated with the current set of commands after writing the current set of commands; and
move the current confirm point to another memory unit if there is sufficient space in the allocation list to store the handles associated with the current set of commands after writing the current set of commands.

22. The computer-readable storage medium of claim 19, further comprising instructions that cause the one or more processors to:
release memory units from the chain of memory units prior to the memory unit in which the current confirm point is identified; and
allocate one or more additional memory units to the chain of memory units if the end of the chain of memory units is reached with commands of the current set of commands that have not yet been written to the chain of memory units.

23. The computer-readable storage medium of claim 19, further comprising instructions that cause the one or more processors to:
clear the allocation list if there is not sufficient space in the allocation list to store the handles associated with the current set of commands.

24. The computer-readable storage medium of claim 19, wherein the instructions that cause the one or more processors to write the current set of commands in the chain of memory units starting from the current confirm point in the memory unit comprise instructions that cause the one or more processors to write the current set of commands in the chain of memory units without determining whether there is sufficient space in the chain of memory units to store the current set of commands.

25. The computer-readable storage medium of claim 19, wherein the instructions that cause the one or more processors to write the current set of commands in the chain of memory units starting from the current confirm point in the memory unit comprise instructions that cause the one or more processors to write the current set of commands in the chain of memory units without determining whether there is sufficient space in the allocation list to store the handles associated with the current set of commands.

26. A device comprising:
a system memory comprising a command buffer; and
a processor comprising:
means for writing a current set of commands to a chain of memory units in the command buffer starting from a current confirm point in a memory unit of the chain of memory units, wherein the chain of memory units stores previously confirmed commands that the processor stored in the chain of memory units before the writing of the current set of commands, and wherein the previously confirmed commands have handles that are stored in an allocation list;
means for determining at least one of:
whether an end of the chain of memory units is reached with commands of the current set of commands that have not yet been written to the chain of memory units during the writing of the current set of commands; or
whether there is sufficient space in the allocation list to store handles associated with the current set of commands after the writing of the current set of commands; and
means for submitting for eventual execution the previously confirmed commands that were stored by the processor in the chain of memory units before the writing of the current set of commands if the end of the chain of memory units is reached with commands of the current set of commands that have not yet been written to the chain of memory units or if there is insufficient space in the allocation list to store handles associated with the current set of commands.

27. The device of claim 26, further comprising:
means for storing the handles associated with the current set of commands in a temporary list during the writing of the current set of commands,
wherein the means for determining whether there is sufficient space in the allocation list comprises means for determining whether adding the handles in the temporary list to the allocation list requires more space in the allocation list than available by attempting to add the handles in the temporary list to the allocation list.

28. The device of claim 26, further comprising:
means for storing the handles associated with the current set of commands in the allocation list if there is sufficient space in the allocation list to store the handles associated with the current set of commands after writing the current set of commands; and
means for moving the current confirm point to another memory unit if there is sufficient space in the allocation list to store the handles associated with the current set of commands after writing the current set of commands.

29. The device of claim 26, further comprising:
means for releasing memory units from the chain of memory units prior to the memory unit in which the current confirm point is identified; and
means for allocating one or more additional memory units to the chain of memory units if the end of the chain of memory units is reached with commands of the current set of commands that have not yet been written to the chain of memory units.

30. The device of claim 26, further comprising:
means for clearing the allocation list if there is not sufficient space in the allocation list to store the handles associated with the current set of commands.

31. The device of claim 26, wherein the means for writing the current set of commands in the chain of memory units starting from the current confirm point in the memory unit comprises means for writing the current set of commands in the chain of memory units without determining whether there is sufficient space in the chain of memory units to store the current set of commands.

32. The device of claim 26, wherein the means for writing the current set of commands in the chain of memory units starting from the current confirm point in the memory unit comprises means for writing the current set of commands in the chain of memory units without determining whether there is sufficient space in the allocation list to store the handles associated with the current set of commands.

* * * * *